US012689024B2

(12) United States Patent
Liu et al.

(10) Patent No.: US 12,689,024 B2
(45) Date of Patent: Jul. 21, 2026

(54) CARBON-SILICON COMPOSITE STRUCTURES AND METHODS OF FABRICATING THEREOF

(71) Applicant: Clyra Inc., Dover, DE (US)

(72) Inventors: Xiaohua Liu, Mountain View, CA (US); Xiahui Yao, San Jose, CA (US); Sa Zhou, Fremont, CA (US); Song Han, Foster City, CA (US)

(73) Assignee: Clyra Inc., Dover, DE (US)

( * ) Notice: Subject to any disclaimer, the term of this patent is extended or adjusted under 35 U.S.C. 154(b) by 0 days.

(21) Appl. No.: 18/488,721

(22) Filed: Oct. 17, 2023

(65) Prior Publication Data

US 2024/0128441 A1     Apr. 18, 2024

Related U.S. Application Data

(60) Provisional application No. 63/379,810, filed on Oct. 17, 2022.

(51) Int. Cl.
*H01M 4/04* (2006.01)
*H01M 4/36* (2006.01)
(Continued)

(52) U.S. Cl.
CPC ........... *H01M 4/364* (2013.01); *H01M 4/044* (2013.01); *H01M 4/386* (2013.01); *H01M 4/583* (2013.01); *H01M 2004/021* (2013.01)

(58) Field of Classification Search
CPC .. H01M 4/1393; H01M 4/1395; H01M 4/362; H01M 4/366; H01M 4/386;
(Continued)

(56) References Cited

U.S. PATENT DOCUMENTS

2020/0020935 A1* 1/2020 Costantino ............ C01B 33/029
2021/0074991 A1* 3/2021 Gaben ................. H01M 4/0428

FOREIGN PATENT DOCUMENTS

CN       110600719 B    10/2021
GB        2612092 A  *  4/2023   ........... C01B 33/027
(Continued)

OTHER PUBLICATIONS

Cahen, S., et al., "Chemical reduction of SiCl4 for the preparation of silicon-graphite composites used as negative electrodes in lithium-ion batteries." Journal of The Electrochemical Society, 155 (7): A512-A519, (2008).
(Continued)

*Primary Examiner* — Allison Bourke
*Assistant Examiner* — Charlene Bermudez
(74) *Attorney, Agent, or Firm* — Polygon IP, LLP

(57)     ABSTRACT

Described herein are carbon-silicon composite structures and methods of producing such structures. A carbon-silicon composite structure comprises one or more carbon-containing structures that have pores at least partially filled with silicon-containing structures. Specifically, the silicon-containing structures are attached to the pore walls while maintaining void spaces within these pores. These void spaces can accommodate silicon expansion during lithiation. Carbon-silicon composite structures can be produced by submerging carbon-containing structures into a precursor liquid solution (comprising a precursor) and driving this solution into the pores. The silicon-containing structures are then formed (from the precursor) within the pores either electrochemically (e.g., by applying a voltage to the solution and structures) or chemically (e.g., by introducing the structures into a reducing liquid solution). In some examples, these void spaces are sealed from the environment by (Continued)

additional structures, e.g., separate silicon-containing structures and/or carbon structures.

18 Claims, 9 Drawing Sheets

(51) Int. Cl.
    *H01M 4/38*     (2006.01)
    *H01M 4/583*     (2010.01)
    *H01M 4/02*     (2006.01)

(58) Field of Classification Search
    CPC .... H01M 4/044; H01M 4/0445; H01M 4/045;
        H01M 4/0452; H01M 4/0457; H01M
        4/0459; H01M 4/0461; H01M 4/0469;
        H01M 4/0492; H01M 4/04; H01M
        4/0416; H01M 4/0478; H01M 4/048;
        H01M 4/049; H01M 4/0497
    See application file for complete search history.

(56) References Cited

FOREIGN PATENT DOCUMENTS

| | | | |
|---|---|---|---|
| KR | 20160033638 A | 3/2016 | |
| WO | WO-2010035919 A1 * | 4/2010 | .......... H01M 10/052 |
| WO | 2019039856 A1 | 2/2019 | |
| WO | 2021194149 A1 | 9/2021 | |
| WO | WO-2023215232 A2 * | 11/2023 | ............. C01B 32/05 |

OTHER PUBLICATIONS

Gusev, A.V., et al., "Reduction of Silicon Tetrachloride with Hydrogen in a Chemically Active Plasma" Theoretical and Experimental Chemistry, vol. 50, No. 1, (2014).

Lin, Ning, et al., "Preparation of Nanocrystalline Silicon from SiCl4 at 200° C. in Molten Salt for High-Performance Anodes for Lithium Ion Batteries" Angew. Chem. 127: 3893-3896 (2015).

Liong, W. L., et al., "Effect of concentration of sodium borohydrate on the synthesis of silicon nanoparticles via microemulsion route." World Academy of Science, Engineering and Technology 59, 419-422 (2009).

International Application Serial No. PCT/US23/77097, Search Report and Written Opinion mailed Feb. 20, 2024, 12 pgs.

* cited by examiner

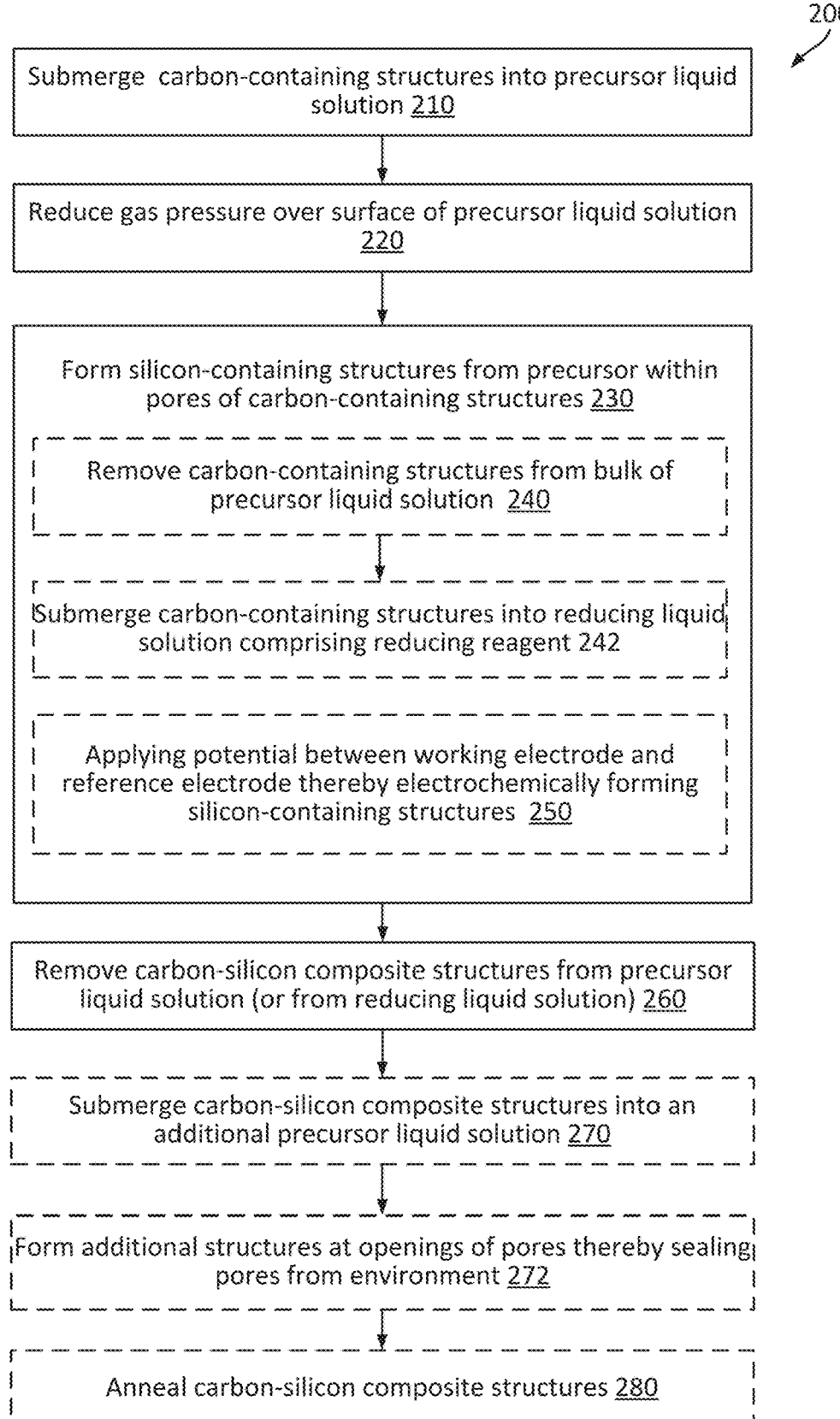

200

Submerge carbon-containing structures into precursor liquid solution 210

↓

Reduce gas pressure over surface of precursor liquid solution 220

↓

Form silicon-containing structures from precursor within pores of carbon-containing structures 230

Remove carbon-containing structures from bulk of precursor liquid solution 240

↓

Submerge carbon-containing structures into reducing liquid solution comprising reducing reagent 242

Applying potential between working electrode and reference electrode thereby electrochemically forming silicon-containing structures 250

↓

Remove carbon-silicon composite structures from precursor liquid solution (or from reducing liquid solution) 260

↓

Submerge carbon-silicon composite structures into an additional precursor liquid solution 270

↓

Form additional structures at openings of pores thereby sealing pores from environment 272

↓

Anneal carbon-silicon composite structures 280

Vacuum 311   310   110

136   110   310
130

139

Precursor liquid solution 310

Precursor 320

Solvent 330

Additive 340

Additional precursor liquid solution 610

Additional precursor 620

Additional solvent 630

Additional additive 640

1

CARBON-SILICON COMPOSITE STRUCTURES AND METHODS OF FABRICATING THEREOF

CROSS-REFERENCE TO RELATED APPLICATIONS

This application claims the benefit under 35 U.S.C. § 119(e) of U.S. Provisional Patent Application 63/379,810, filed on 2022 Oct. 17, which is incorporated herein by reference in its entirety for all purposes.

BACKGROUND

High-capacity materials, such as silicon, are very desirable for various battery applications because of their high gravimetric (3579 mAh/g) and volumetric capacities. However, many high-capacity materials undergo significant volume changes during charge-discharge cycling (e.g., incorporation-removal of lithium ions). The repeated cycling and corresponding volume changes can cause pulverization of these materials and/or loss of electrical connections between these materials and other electrode components. Conventional integration of high-capacity materials into electrodes typically results in high irreversible capacity losses, excessive solid electrolyte interphase (SEI) formation, and losses of electrical contacts within electrodes formed from these materials, all of which are highly undesirable. These issues have limited the application of high-capacity active materials in batteries. As a result, graphite with a capacity of only 372 mAh/g remains the most common negative active material in lithium-ion batteries.

Different solutions have been proposed to address these high-capacity material integration issues. One example involves using silicon nanostructures with controlled porosity to buffer the volume expansion. Another example uses composites with a conductive matrix including various carbon structures. For example, chemical vapor deposition (CVD) has been proposed for depositing silicon structures (from gas-phase Si-containing precursors such as silane ($SiH_4$) and silicon tetrachloride ($SiCl_4$)) and onto various matrix materials. Unfortunately, gas-phase precursors are flammable (or even explosive) and are difficult to transport over long distances. Furthermore, a gas phase precursor occupies a much larger space in comparison to liquid or solid precursors needed to produce the same amount of silicon. Yet another example relies on nano-silicon domains dispersed in bulky silicate matrices (e.g., $MgSiO_3$, $Li_2SiO_3$). However, all of the solutions have various drawbacks such as the low packing density of porous materials, the high production cost of depositing silicon onto the carbon structures using gas-phase reactions, and the instability caused by aggregation and pulverization of silicon nanodomains inside silicate matrices.

What is needed are carbon-silicon composite structures comprising carbon-containing structures with pores partially filled by silicon structures or, more generally, silicon-containing structures and methods of forming such composite structures.

SUMMARY

Described herein are carbon-silicon composite structures and methods of producing such structures. A carbon-silicon composite structure comprises one or more carbon-containing structures that have pores at least partially filled with silicon-containing structures. Specifically, the silicon-containing structures are attached to the pore walls while maintaining void spaces within these pores. These void spaces can accommodate silicon expansion during lithiation. Carbon-silicon composite structures can be produced by submerging carbon-containing structures into a precursor liquid solution (comprising a precursor) and driving this solution into the pores. The silicon-containing structures are then formed (from the precursor) within the pores either electrochemically (e.g., by applying a voltage to the solution and structures) or chemically (e.g., by introducing the structures into a reducing liquid solution). In some examples, these void spaces are sealed from the environment by additional structures, e.g., separate silicon-containing structures and/or carbon structures.

Clause 1. Carbon-silicon composite structures comprising: carbon-containing structures, wherein: the carbon-containing structures comprise pores and an exterior surface extending among the pores, and the carbon-containing structures are formed from at least one of graphite, hard carbon, glassy carbon, carbon foam, carbon paper, carbon molecular sieve, carbon black, activated carbon, carbon fibers, carbon nanotubes, graphene, a graphene derivative, zero-dimensional fullerene, and a fullerene derivative; and silicon-containing structures forming a layer coating the carbon-containing structures, wherein: the layer of the silicon-containing structures extends into at least some of the pores of the carbon-containing structures and forms one or more of silicon-structure pores and silicon plugs with the pores the carbon-containing structures, and the layer of the silicon-containing structures further extends over the exterior surface of the carbon-containing structures among the pores.

Clause 2a. The carbon-silicon composite structures of clause 1, wherein the carbon-containing structures have a porosity of at least 1 m2/g, not accounting for the silicon-containing structures.

Clause 2b. The carbon-silicon composite structures of clause 1, wherein the silicon-containing structures comprise one or more non-silicon materials selected from the group consisting of carbon, lithium, oxygen, titanium, nitrogen, magnesium, calcium, boron, phosphorous, fluorine, chlorine, bromine, iodine, hydrogen, iron, aluminum, copper, nickel, tin, and germanium.

Clause 2c. The carbon-silicon composite structures of clause 2a, wherein the silicon-containing structures comprise the one or more non-silicon materials selected from the group consisting of carbon and lithium.

Clause 2d. The carbon-silicon composite structures of clause 2a, wherein a weight ratio of the one or more non-silicon materials in the silicon-containing structures 0.1%-50%.

Clause 3. The carbon-silicon composite structures of clause 1, wherein the pores of the carbon-containing structures have a pore size of between 5 nanometers and 200 nanometers, not accounting for the silicon-containing structures.

Clause 4. The carbon-silicon composite structures of clause 1, wherein an average thickness (T) of the layer formed by the silicon-containing structures is between 1 nanometer and 50 micrometers.

Clause 5. The carbon-silicon composite structures of clause 1, wherein an average cross-sectional dimension (D1) of the carbon-silicon composite structures is between 1 nanometer and 100 micrometers.

Clause 6. The carbon-silicon composite structures of clause 1, further comprising additional structures, positioned at openings of the silicon-structure pores thereby sealing the silicon-structure pores from the environment.

Clause 7. The carbon-silicon composite structures of clause 6, wherein an exposed surface area of the carbon-silicon composite structures is reduced by at least two times with the additional structures at the openings of the pores.

Clause 8. The carbon-silicon composite structures of clause 6, wherein the porosity of the carbon-silicon composite structures is at least 30% with the additional structures at the openings of the pores.

Clause 9. The carbon-silicon composite structures of clause 6, wherein the additional structures comprise silicon.

Clause 10. The carbon-silicon composite structures of clause 1, wherein the silicon-containing structures are amorphous or partially in a crystalline state.

Clause 11. The carbon-silicon composite structures of clause 1, wherein a weight ratio of silicon in the carbon-silicon composite structures is between 5%-95%.

Clause 12. The carbon-silicon composite structures of clause 1, wherein a weight ratio of silicon in the carbon-silicon composite structures is between 0.1%-5%.

Clause 13. A method of producing carbon-silicon composite structures, the method comprising: submerging carbon-containing structures into a precursor liquid solution comprising a precursor, wherein the carbon-containing structures comprise pores and an exterior surface extending among the pores; reducing a gas pressure over a surface of the precursor liquid solution thereby driving the precursor liquid solution into the pores of the carbon-containing structures; and forming silicon-containing structures from the precursor within the pores and on the exterior surface of the carbon-containing structures thereby producing the carbon-silicon composite structures.

Clause 14. The method of clause 13, wherein, prior to forming the silicon-containing structures, the carbon-containing structures have a porosity of at least 1 m2/g.

Clause 15. The method of clause 13, wherein the carbon-containing structures comprise at least one of graphite, hard carbon, glassy carbon, carbon foam, carbon paper, carbon molecular sieve, carbon black, activated carbon, carbon fibers, carbon nanotubes, graphene and graphene derivatives, and zero-dimensional fullerene and fullerene derivatives.

Clause 16. The method of clause 13, wherein the silicon-containing structures comprise a layer coating the interior surfaces of the pores, coating the exterior surface of the carbon-containing structures, or coating both the interior surfaces of the pores and the exterior surface of the carbon-containing structures.

Clause 17. The method of clause 16, wherein an average thickness (T) of the layer formed by the silicon-containing structures is between 1 nanometer and 50 micrometers.

Clause 18. The method of clause 13, wherein an average cross-sectional dimension (D1) of the carbon-silicon composite structures is between 1 nanometer and 100 micrometers.

Clause 19. The method of clause 13, wherein the precursor is one or more of $SiCl_4$, $SiHCl_3$, $SiH_2Cl_2$, $(SiHCl_2)_2$, and $SiCl_2[Si(CH_3)_3]_2$, $SiF_4$, $SiBr_4$, and $SiI_4$.

Clause 20. The method of clause 13, wherein forming the silicon-containing structures comprises: removing the carbon-containing structures from a bulk of the precursor liquid solution such that a portion of the precursor liquid solution remains within the pores of the carbon-containing structures and on the exterior surface; and submerging the carbon-containing structures, with the portion of the precursor liquid solution remaining within the pores and on the exterior surface of the carbon-containing structures, into a reducing liquid solution comprising a reducing reagent that reacts with the precursor in the portion of the precursor liquid solution remaining within the pores and on the exterior surface forms the silicon-containing structures at least within the pores.

Clause 21. The method of clause 20, wherein the reducing reagent is one or more of sodium borohydride ($NaBH_4$) and lithium aluminum hydride ($LiAlH_4$), sodium hydride (NaH), silicon hydride (SiHx), sodium biphenyl, lithium biphenyl, potassium biphenyl, sodium naphthalene, lithium naphthalene, potassium naphthalene, and potassium crown ether.

Clause 22. The method of clause 20, wherein removing the carbon-containing structures from the bulk of the precursor liquid solution comprises one of centrifuged and filtering.

Clause 23. The method of clause 20, wherein a weight ratio of the portion of the precursor liquid solution remaining within the pores and on the exterior surface of the carbon-containing structures is between 0.01 and 10000.

Clause 24. The method of clause 13, wherein: the carbon-containing structures are supported on a working electrode; a reference electrode is further submerged into the precursor liquid solution; and forming the silicon-containing structures comprises applying a potential between the working electrode and the reference electrode thereby electrochemically forming the silicon-containing structures.

Clause 25. The method of clause 24, wherein the potential applied between the working electrode and the reference electrode is between 0.5V to 10V such that the working electrode is operable as a cathode.

Clause 26. The method of clause 13, further comprising: submerging the carbon-silicon composite structures, comprising the silicon-containing structures at least with the pores of the carbon-containing structures, into an additional precursor liquid solution such that the pores remain substantially free from the additional precursor liquid solution; and forming additional structures at openings of the pores thereby sealing the pores from environment.

Clause 27. The method of clause 26, wherein the additional precursor liquid solution and the precursor liquid solution differ in one or more of viscosity, surface tension, and temperature.

Clause 28. The method of clause 26, wherein an exposed surface area of the carbon-silicon composite structures is reduced by at least two times after forming the additional structures at the openings of the pores.

Clause 29. The method of clause 26, wherein the porosity of the carbon-silicon composite structures, after forming the additional structures at the openings of the pores, is at least 30%.

Clause 30. The method of clause 26, wherein the precursor is one or more of silicon tetrafluoride ($SiF_4$), silicon tetrachloride ($SiCl_4$), silicon tetrabromide ($SiBr_4$), silicon tetraiodide ($SiI_4$), $HSiF_3$, $H_2SiF_2$, $H_3SiF$, $HSiCl_3$, $H_2SiCl_3$, $H_3SiCl$, $HSiBr_3$, $H_2SiBr_2$, $H_3SiBr$, $HSiI_3$, $H_2SiI_2$, $H_3SiI$, germanium tetrachloride ($GeCl_4$), germanium tetrabromide ($GeBr_4$), germanium tetraiodide ($GeI_4$), tin tetrachloride ($SnCl_4$), tin tetrabromide ($SnBr_4$) tin nitrate ($Sn(NO_3)_4$), tin (II) chloride ($SnCl_2$), aluminum chloride ($AlCl_3$), phosphorous chloride ($PCl_3$), lithium hexafluorophosphate ($LiPF_6$), lithium perchlorate ($LiClO_4$), lithium Bis(fluorosulfonyl) imide (LiFSI), lithium bis(trifluoromethanesulfonyl)imide (LiTFSI), lithium nitrate ($LiNO_3$), lithium chloride (LiCl), lithium bromide (LiBr), lithium iodode (LiI), cholorobenzene ($C_6H_5Cl$), dicholorbenze ($C_6H_4Cl_2$), trichlorobenze ($C_6H_3Cl$), hexacholorbenzene ($C_6Cl_6$), dibromobenzene ($C_6H_4Br_2$), chloromethane ($CH_3Cl$), dicholoromethane ($CH_2Cl_2$), trichloromethane ($CHCl_3$), tetrachloro carbon (CCl$_4$), and tetrabromo carbon (CBr$_4$), pitch, acetylene (C$_2$H$_2$), methane (CH$_4$), propylene (C$_3$H$_6$), methanol (CH$_3$OH), ethanol (C$_2$H$_5$OH), isopropanol (C$_3$H$_8$O), acetonitrile (CH$_3$CN), benzene (C$_6$H$_6$), toluene (C$_6$H$_5$CH$_3$), propylene carbonate, glucose, dopamine, polyethylene glycol (PEG), melamine, phenol formaldehyde resin, polyimide resin, epoxy resin, cane sugar, and graphite powder.

These and other embodiments are described further below with reference to the figures.

BRIEF DESCRIPTION OF THE DRAWINGS

FIG. 2 is a process flowchart corresponding to a method for producing carbon-silicon composite structures, in accordance with some examples.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Example of Methods for Producing Carbon-Silicon Composite Structures

As noted above integrating silicon and carbon structures has been challenging, in particular using gas phase deposition of silicon. Described herein are carbon-silicon composite structures and liquid-based methods of producing such structures. A carbon-silicon composite structure comprises one or more carbon-containing structures that serve as base structures or shells and that comprise pores. These pores may be referred to as pre-filled carbon-structure pores. The carbon-silicon composite structure also comprises silicon-containing structures that at least partially fill the voids and that are formed using liquid-based deposition techniques (e.g., chemical or electrochemical reactions within liquid solutions). The carbon-containing structures provide support, electronic conductivity, and, in some examples, ionic conductivity to silicon-containing structures. At the same time, silicon-containing structures contribute to the overall capacity of carbon-silicon composite structures by accepting and releasing lithium. As noted above, the theoretical capacity of silicon is substantially higher than that of graphite. However, silicon suffers from excessive volume changes and provides poor support to SEI layers (due to silicon volume changes). Carbon-silicon composite structures address these challenges by providing sufficient support to silicon-containing structures (e.g., in the form of void walls of the carbon-containing structures) and space to expand to (e.g., the voids). Furthermore, in some examples, these voids are protected from the electrolyte, e.g., by forming blocking structures covering void entrances (after silicon-containing structures have been already formed within the pores thereby forming silicon plugs or pores with at least some silicon boundaries). In some examples, silicon-containing structures within these pores/voids can be isolated from electrolytes, and SEI layers are not formed on these structures.

Figure 1A:
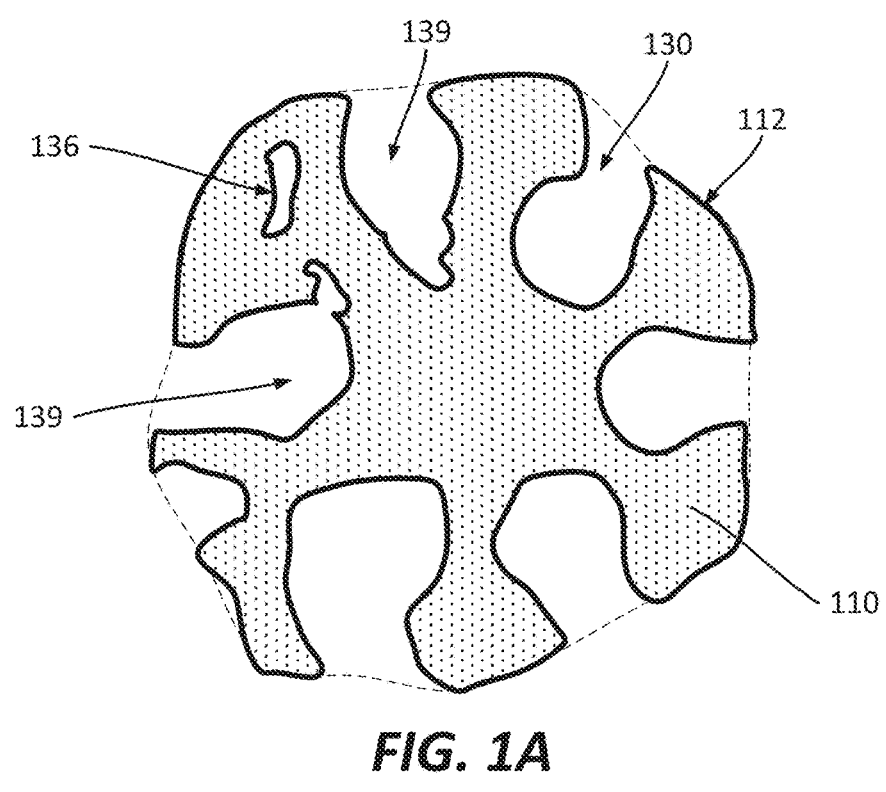
FIG. 1A is an example of a carbon-containing structure prior to forming a silicon-containing structure/layer on the exterior surface of the carbon-containing structures, providing an illustration of pre-filled carbon-structure pores.

Carbon-silicon composite structures 100 can be formed by forming one or more silicon-containing structures 120 over one or more carbon-containing structures 110. FIG. 1A is an example of a carbon-containing structure 110 prior to forming a silicon-containing structure/layer on the exterior surface 112 of the carbon-containing structure 110, providing an illustration of pre-filled carbon-structure pores 130. These pre-filled carbon-structure pores 130 can include pre-filled carbon-structure open pores 139 and carbon-structure closed pores 136. The carbon-structure closed pores 136 may remain unchanged during the formation of the silicon-containing structure 120 (e.g., the silicon-containing structure 120 is not able to reach these carbon-structure closed pores 136). However, the pre-filled carbon-structure open pores 139 can receive at least some of the silicon-containing structure 120 as further described below with the reference to FIG. 1B.

For purposes of this disclosure, a pore is defined as a void space with the boundary at least partially defined by a solid-gas/liquid interface. It should be noted that the gas/liquid interface depends on the environment of the structure containing this pore. Furthermore, a pore may be partially or fully filled with another solid thereafter, which transforms this solid-gas/liquid interface into a solid/solid interface.

When the pore is partially filed, a new solid-gas/liquid interface can be created, i.e., by the material filling the original pore.

A closed pore has the entire boundary defined by a solid-gas/liquid interface. An open pore has at least a portion of the boundary defined as a non-solid interface (e.g., gas-gas or liquid-liquid). This non-solid interface can be defined by extending the external surface contour (shown with dashed lines in FIG. 1A) of the particle, which contains this pore and can be also referred to as a pore opening. To differentiate, a pore from a surface roughness, the non-solid interface is less than 25% of the entire pore boundary or even less than 10%. In some examples, the non-solid interface is defined as a "neck" (narrowing) portion separating two wider portions, e.g., one exterior of the pore and one within the pore. Another aspect of this non-solid interface can be defined by completing an imaginary enclosed shape outside of the pore using pore surfaces approaching this non-solid interface. In other words, the non-solid interface separates the solid-gas/liquid interface within the pore and the imaginary enclosed shape outside of the pore such that the surface area of the solid-gas/liquid interface within the pore is greater than the surface area of the imaginary enclosed shape outside of the pore.

Figure 1B:
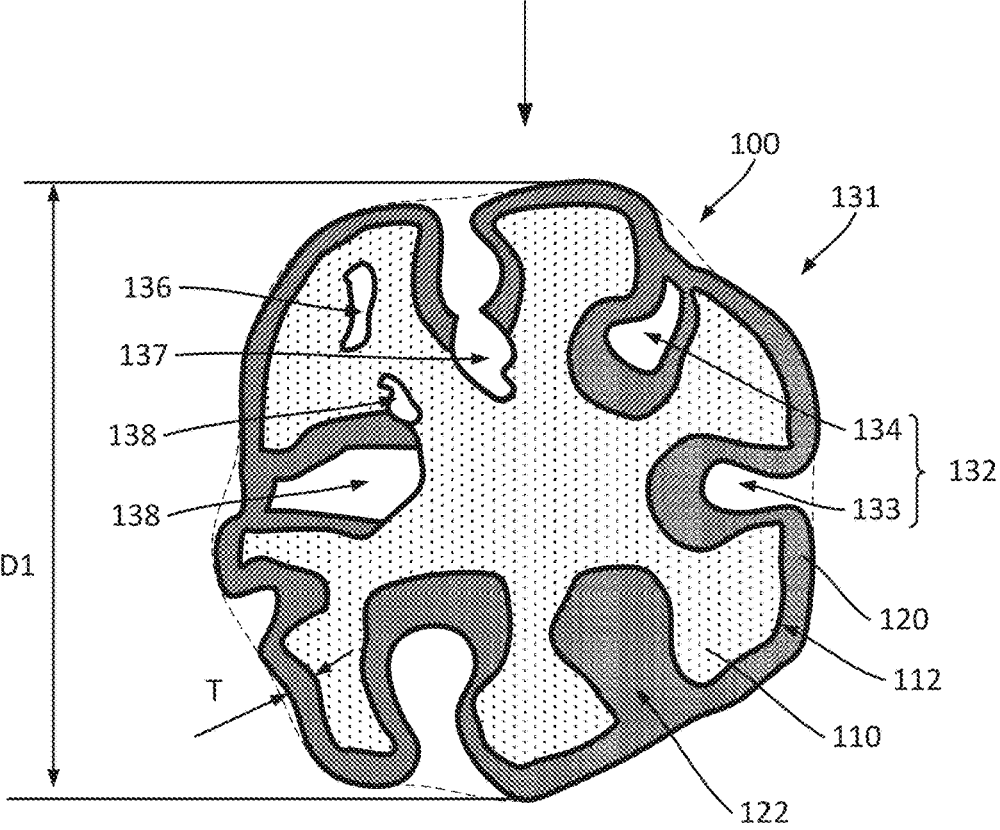
FIG. 1B is an example of a carbon-silicon composite structure comprising carbon-containing structures and silicon-containing structures (e.g., formed as a layer on the exterior surface of the carbon-containing structures) providing an illustration of post-filled pores.
Figure 1C:
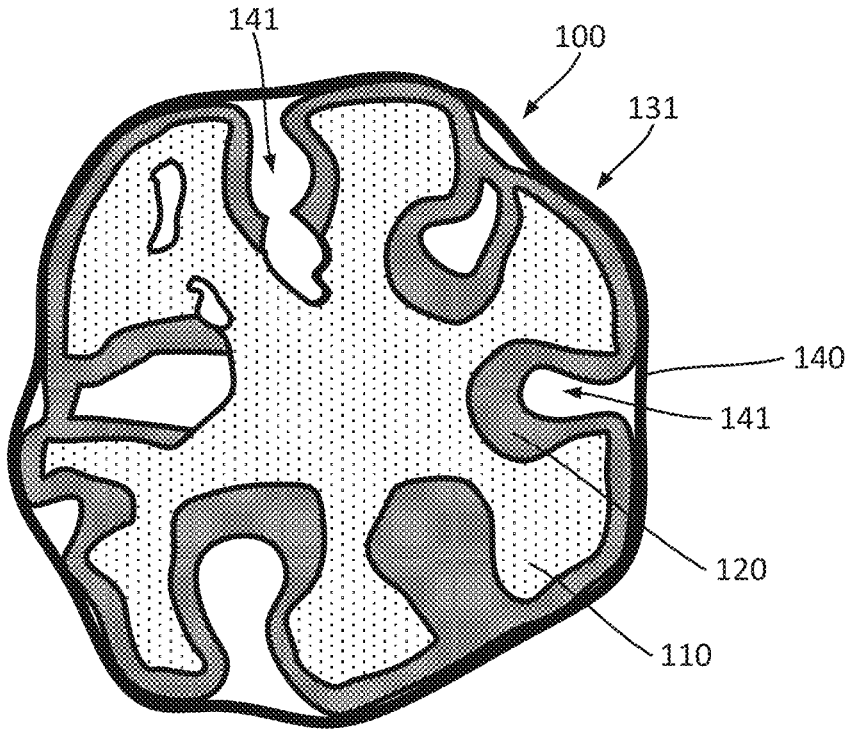
FIG. 1C is an example of a carbon-silicon composite structure similar to the one in FIG. 1B but with the internal voids sealed from the environment by an additional structure, in accordance with some examples.

FIGS. 1B and 1C are two examples of carbon-silicon composite structures 100. Each carbon-silicon composite structure 100 comprises one or more carbon-containing structures 110 and one or more silicon-containing structures 120 disposed within pores 130 and on exterior surface 112 of carbon-containing structures 110. While FIGS. 1B and 1C illustrate examples in which carbon-silicon composite structure 100 is formed by a single carbon-containing structure 110 and silicon-containing structure 120 (e.g., as a layer or, in more specific examples, a conformal layer), other examples are also within the scope. For example, multiple carbon-containing structures 110 can cluster together (e.g., forming a secondary structure) which share silicon-containing structures 120 in the same carbon-silicon composite structure 100. Furthermore, silicon-containing structures 120 can be in the form of disjoined structures, e.g., patches, that only partially cover the surface of carbon-containing structures 110.

In some examples, at least some pores 130 (with silicon-containing structures 120 positioned therein) remain open as, e.g., schematically shown in FIG. 1B. For purposes of this disclosure, the pores 130 with silicon-containing structures 120 positioned therein can be also referred to as voids to indicate free space within carbon-silicon composite structures 100. These free spaces may be smaller than the original pores 130 in carbon-containing structures 110 since a part of the original volume is now occupied by silicon-containing structures 120. Returning to an example in FIG. 1B, the electrolyte can enter open pores and directly interface with silicon-containing structures 120 positioned therein. In some examples, some openings into even open pores are too small for the electrolyte to enter. Furthermore, additional pores may be closed. Finally, some of the original pores 130 in carbon-containing structures 110 may be completely filled. Different types of pores will now be described.

Specifically, FIG. 1B provides an illustration of post-filled pores 131, formed from the original pores 130 in carbon-containing structure 110 when a silicon-containing structure 120 is formed over a carbon-silicon composite structure 100. As noted above, the carbon-structure closed pores 136 may remain unchanged and now are a part of the post-filled pores 131. However, the pre-filled carbon-structure open pores 139 can receive some of the silicon-containing structure 120 and are converted into silicon-structure pores 132, carbon-silicon open pores 137, carbon-silicon closed pores 138, and silicon plugs 122. Specifically, the silicon-structure pores 132 are the pores that fully reside within the silicon-containing structures 120 (and do not extend to carbon-containing structures 110). More specific examples of such silicon-structure pores 132 include silicon-structure open pores 133 and silicon-structure closed pores 134.

The silicon-structure open pores 133 are defined by the boundary of the silicon-gas/liquid interface as well as the non-solid (silicon) interface (at the opening). The silicon-structure closed pores 134 are fully defined by the silicon-gas/liquid interface. The electrolyte may or may not enter such pores. In some examples, these pores remain filled with the gas present during the deposition of silicon-containing structures 120. The carbon-silicon open pores 137 have both a silicon-gas/liquid interface and a carbon-gas/liquid interface as well as a non-solid interface (at the opening).

Referring to FIG. 1C, in some examples, substantially all of the original pores 130 (e.g., more than 95 of all pores) are turned into closed pores. As noted above, after depositing silicon-containing structures 120, some pores (e.g., carbon-silicon open pores 137 and silicon-structure open pores 133) may remain open. One or more additional structures 140 (e.g., additional silicon-containing structures) may be formed over silicon-containing structures 120 to seal these pores thereby forming sealed pores 141. As such, all pores in such structures are closed pores, e.g., originally closed pores (e.g., carbon-structure closed pores 136), closed pores formed during the deposition of the silicon-containing structures 120 (e.g., silicon-structure closed pores 134, carbon-silicon closed pores 138), and closed/sealed pores formed during the deposition of the additional structures 140 (e.g., sealed pores 141 for med from carbon-silicon open pores 137 and silicon-structure open pores 133).

In these examples, silicon-containing structures 120 (disposed inside closed pores 130) do not directly interface with the electrolyte but receive lithium through carbon-containing structure 110 that is interfaced by the silicon-containing structures 120. It should be noted that, even in these examples with the closed pores, some silicon-containing structures 120 (e.g., disposed on the exterior surface 112 of carbon-containing structures 110) and/or additional structures 140 (e.g., disposed over silicon-containing structures 120) can still interface electrolyte. In some examples, the additional structures 140 are formed from silicon. In some examples, these additional structures 140 have a thickness of 1-2000 nm or, more specifically, 1-200 nm.

It should be also noted that regardless of the nature of these pores (closed pores or open pores), pores 130 can be used to accommodate the volumetric expansion of silicon-containing structures 120 during their lithiation, thereby reducing the overall swelling/expansion of carbon-silicon composite structures 100. For example, the free space (at no lithiation of silicon-containing structures 120) can be greater than the expansion of silicon-containing structures 120 corresponding to the maximum lithiation levels (e.g., set by the cutoff charging condition). In this example, carbon-silicon composite structures 100 do not experience the overall volume change (which can be otherwise detrimental to the battery cycle life).

Some examples of carbon-containing structures 110 include, but are not limited to, graphite, hard carbon, glassy carbon, carbon foam, carbon paper, carbon molecular sieve, carbon black, activated carbon, carbon fibers, carbon nanotubes, graphene and graphene derivatives, and zero-dimensional fullerene and fullerene derivatives. For example, graphite provides excellent electronic conductivity and is operable as an active material for lithium storage (acts as a lithium intercalation material). Carbon foam, paper, and molecular sieves provide three-dimensional structures and a wide range of surface areas that can be utilized for different silicon loadings, e.g., with larger surface areas providing more sites for depositing silicon-containing structures 120 without excessively increasing the thickness of silicon-containing structures 120. Carbon black can be cost-effective with highly tunable size and pore structures. Activated carbon is microporous with very high specific surface areas (e.g., greater than 3000 $m^2/g$), which can be leveraged to increase silicon loading. Carbon fibers and carbon nanotubes can provide high levels of interconnectivity among deposited silicon-containing structures 120. Graphene and its derivatives have a high surface area (e.g., in comparison to graphite). Finally, zero-dimensional fullerene and derivatives are a family of cage-like carbon molecules with various pore structures that can be used for the co-deposition of silicon into some larger pores or as fillers to buffer expansion.

In some examples, before forming silicon-containing structures 120, carbon-containing structures 110 have a porosity of at least 1 $m^2/g$ or, more specifically, at least 5 $m^2/g$ or even at least 20 $m^2/g$, e.g., between 10 $m^2/g$ and 3000 $m^2/g$ or, more specifically, between 100 $m^2/g$ and 1000 $m^2/g$. In some examples, the pore sizes are between 0.5 nanometers and 1000 nanometers or, more specifically, between 5 nanometers and 200 nanometers. It should be noted that smaller pores may prevent liquid solutions from entering the pores (these solutions are needed to form silicon-containing structures 120 with the pores). On the other hand, having excessively large pores reduces the surface area of carbon-containing structures 110 available for deposition of silicon-containing structures 120 (with smaller pores corresponding to larger surface areas for the same size/weight of carbon-containing structures 110). It should be noted that these pores (before forming silicon-containing structures 120) are open pores to ensure that liquid solutions can enter the pores. Once silicon-containing structures 120 are formed the pores can be closed while retaining voids with carbon-silicon composite structures 100 available for the expansion of silicon-containing structures 120 during their lithiation. In more specific examples, these pores (before forming silicon-containing structures 120) are "bicontinuous", which means that the pores are interconnected (forming continuous pathways for the liquid solution to soak in) while the solid portions of carbon-containing structures 110 are interconnected to maintain the structural integrity.

For example, the pore size, specific area, and pore configurations can be used to characterize porosity using either gas or liquid absorption methods, such as Brunauer-Emmett-Teller BET and mercury intrusion porosimeter. Another important measurement is the oil absorption number (OAN) used for carbon black materials, which characterizes the amount of oil a carbon material can uptake.

It should be noted that once silicon-containing structures 120 are formed within the pores, the size of the remaining pores or voids (in the resulting carbon-silicon composite structures 100) can be significantly reduced, e.g., by a factor of at least 2 or, more specifically, at least 5, or even at least 10. As such, in some examples, most of the initial pore volume (in carbon-containing structures 110 before forming silicon-containing structures 120) can be filled by silicon-containing structures 120 once these silicon-containing structures 120 are formed. Similarly, the pore surface (measured in $m^2/g$) can be similarly reduced, e.g., by a factor of at least 2 or, more specifically, at least 5, or even at least 10.

In some examples, the average cross-sectional dimension (D1) of carbon-silicon composite structures 100 can be large directly after synthesis. The initial size of the can be 1-10 mm, 0.1-1 mm, 10-100 micrometers, or 5-10 micrometers. The large size of the initial particles can be further reduced by mechanical pulverization. In some examples, the average cross-sectional dimension (D1) of carbon-silicon composite structures 100 is between 1 nanometer and 100 micrometers or, more specifically, between 10 nanometers and 1 micrometer or even between 10 nanometers and 100 nanometers. In some examples, the average cross-sectional dimension (D1) is between 1 nanometer and 50 nanometers, between 10 nanometers and 200 nanometers, between 100 nanometers and 1 micrometer, or between 500 nanometers and 100 micrometers. While the larger carbon-silicon composite structures 100 may be beneficial from the integration of silicon and carbon materials, these carbon-silicon composite structures 100 need to be processable in various downstream operations such as mixing into a slurry, slurring coating onto a substrate, as well as other electrode fabrication and handling operations.

In some examples, silicon-containing structures 120 comprise a layer (e.g., a conformal layer) coating the interior surfaces of pores 130 and the exterior surface 112 of carbon-containing structures 110. For example, the average thickness (T) of this layer (formed by silicon-containing structures 120) is between 1 nanometer and 50 micrometers or, more specifically, between 10 nanometers and 1 micrometer or even between 10 nanometers and 100 nanometers. In some examples, the average thickness (T) is between 1 nanometer and 10 nanometers, between 5 nanometers and 50 nanometers, between 20 nanometers and 200 nanometers, between 100 nanometers and 1000 nanometers, or between 200 nanometers and 50 micrometers.

In some examples, the weight ratio of silicon in carbon-silicon composite structures 100 is between 0.1%-99% or, more specifically, between 1%-90% or even between 5%-50%. When silicon-containing structures 120 represent a minor component of carbon-silicon composite structures 100, the weight ratio can be between 0.1%-5%, between 1%-10%, or between 1~50%. When silicon-containing structures 120 represent a major component of carbon-silicon composite structures 100, the weight ratio can be between 30%-60% or 50%-99%.

Example of Methods for Producing Carbon-Silicon Composite Structures

FIG. 2 is a process flowchart of method 200 for producing carbon-silicon composite structures 100, in accordance with some examples. Various aspects of carbon-silicon composite structures 100 are described above.

Figures 3A, 3B:
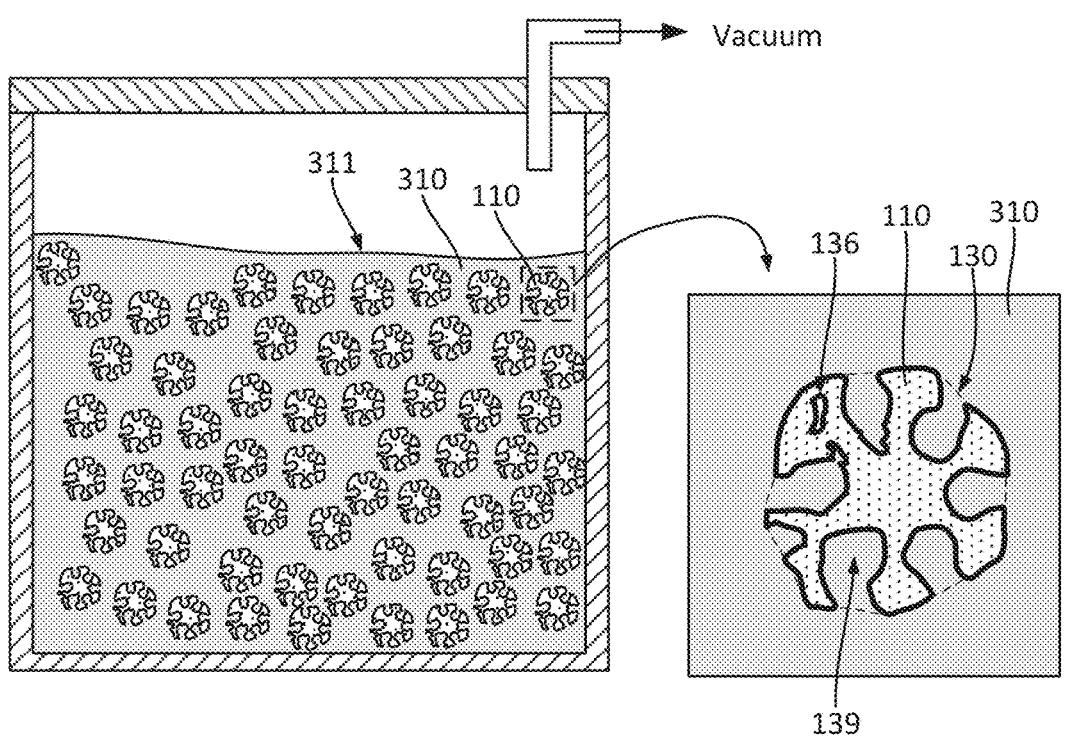
FIG. 3A is a schematic illustration of an enclosure containing a precursor liquid solution and carbon-containing structures dispersed within the solution, in accordance with some examples.
FIG. 3B is a block diagram illustrating various components of the precursor liquid precursor, in accordance with some examples. solution
Figure 5:
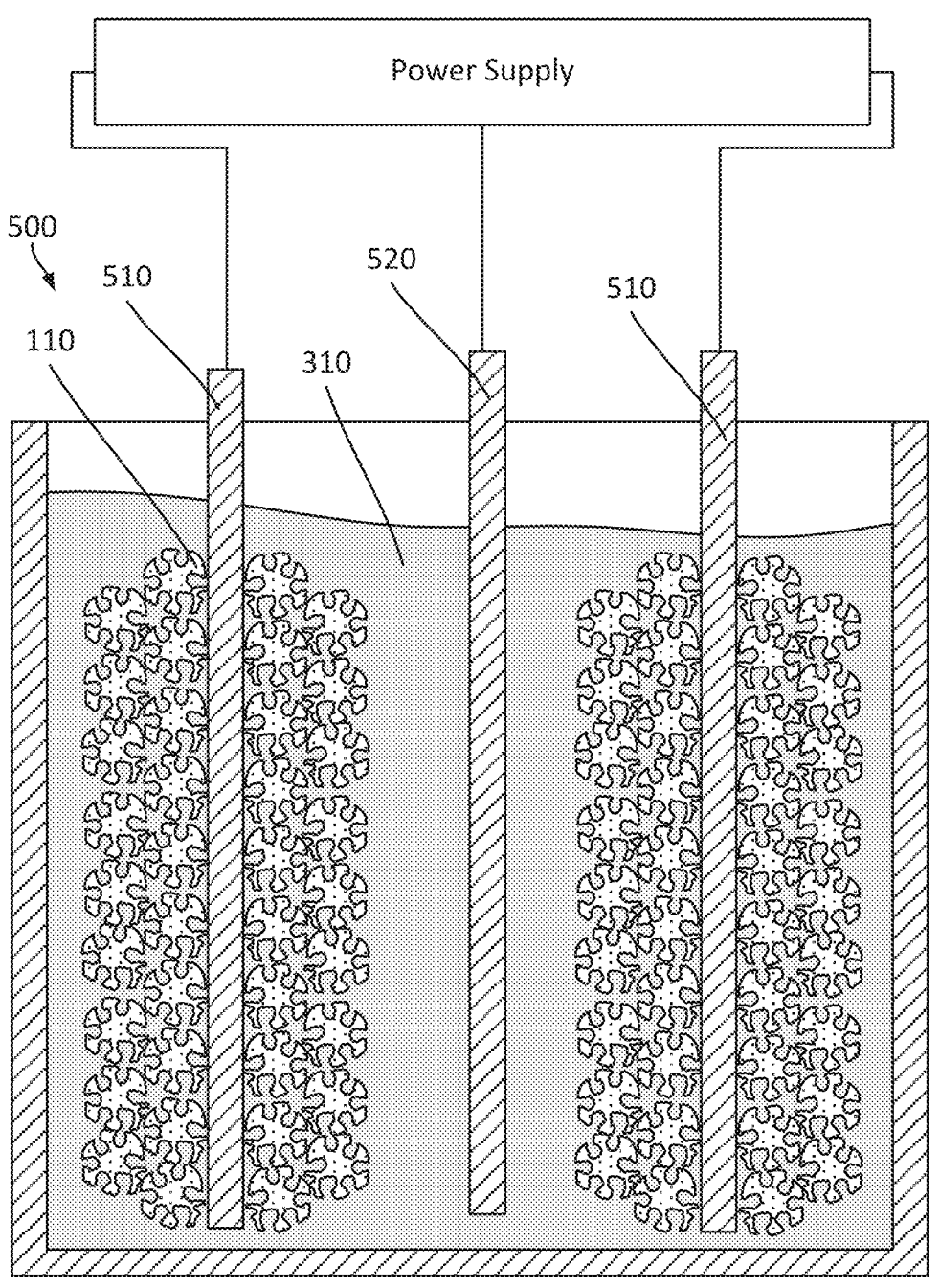
FIG. 5 is a schematic illustration of an electrochemical device configured to form silicon-containing structures at least within the pores of carbon-containing structures, in accordance with some examples.

In some examples, method 200 comprises (block 210) submerging carbon-containing structures 110 into precursor liquid solution 310 as, e.g., schematically shown in FIG. 3A (for chemical deposition of silicon-containing structures 120) and FIG. 5 (for electrochemical deposition of silicon-containing structures 120). As shown in FIG. 3B, precursor liquid solution 310 comprises precursor 320 and solvent 330. In some examples, precursor liquid solution 310 also comprises one or more additives 340. These components of precursor liquid solution 310 are further described below. In general, the composition of precursor liquid solution 310 depends on the deposition methods (e.g., chemical, electrochemical) that are used to form silicon-containing structures 120.

As shown in FIG. 3A, carbon-containing structures 110 comprise pores 130. Exterior surface 112 of carbon-containing structures 110 extend among pores 130. The size of pores 130 may be sufficiently small for precursor liquid solution 310 to enter pores 130 without any additional stimulation (e.g., reducing the pressure over surface 311 of precursor liquid solution 310). Overall, the pressure-reducing operation (which may be also referred to as "degas") can be used to improve wetting and facilitate liquid replacement into the pores. For example, the density measurement can be used to check for the gas portion still present in the liquid suspension. Specifically, the "fully-filled" density can be determined by the actual densities of the liquid solution and the material of carbon-containing structures 110, both of which are much higher than the air density (or, more generally, the density of gases) that would otherwise fill the voids. If gases are still present in pores, there will be some deviation from the expected true density. Furthermore, a liquid suspension with a lot of trapped gas would expand significantly when the environmental pressure is reduced. At the same time, introducing precursor liquid solution 310 into pores 130 is essential to ensure that silicon-containing structures 120 are formed within pores 130. It should be noted that the total surface area of carbon-containing structures 110 is much greater than its exterior surface 112 because a large portion of the total surface area is within pores 130. Utilizing as much of this total surface area as possible is beneficial to ensure a higher silicon loading in carbon-silicon composite structures 100 while maintaining the thickness of silicon-containing structures 120 as small as possible (e.g., to reduce the pulverization aspects during lithiation). Furthermore, depositing silicon-containing structures 120 within pores 130 may reduce subsequent contact of silicon-containing structures 120 with the electrolyte.

In some examples, precursor 320 is one or more of $SiCl_4$, $SiHCl_3$, $SiH_2Cl_2$, $(SiHCl_2)_2$, and $SiCl_2[Si(CH_3)_3]_2$, $SiF_4$, $SiBr_4$, and $SiI_4$. Some other polysilanes with ($—SiR_2—$), formula can be used as well, such as cyclopentasilane ($Si_5H_{10}$, here R=H, n=5). Many other chlorosilanes with a general formula of $R_mSiCl_n$ ($R=C_xH_y$), such as diphenyldichlorosilane ($R=C_6H_5$, m=n=2) can be used as liquid Si precursors. These precursor 320 can operate similarly to forming silicon layers during atomic layer deposition (ALD). However, it should be noted that in ALD, precursors are supplied as gases (vaporized) and are used to form monolayers on the deposition surface by absorption to achieve very precise (and very slow) layer-by-layer deposition. Liquid-phase precursor supply and reactions are much quicker and produce bulkier silicon-containing structures 120, which are needed to ensure adequate loading of silicon-containing structures in carbon-silicon composite structures 100. In other words, ALD is not able to form sufficiently large silicon-containing structures in a fast and cost-efficient manner.

In some examples, solvent 330 of the precursor liquid solution 310 comprises one or more of cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), diglyme, triglyme, tetraglyme, acetonitrile, and one or more ionic liquids. Some examples of these ionic liquid species include, but are not limited to, 1-Ethyl-3-methylimidazolium bis(trifluoromethylsulfonyl)imide (EMIMTFSI), 1-Butyl-1-methylpyrrolidinium bis(trifluoromethanesulfonyl)imide (BMPTFSI), 1-propyl-1-methylpyrrolidinium bis(trifluoromethanesulfonyl)imide (PMPTFSI), or 1-Butyl-3-methylimidazolium tetrafluoroborate ($bmimBF_4$). Solvents 330 are selected to ensure that the precursors can dissolve at given concentrations and temperatures. Without being restricted to any particular theory, it is believed that the listed solvent examples provide good solubility to the listed precursors and are stable during various deposition conditions (e.g., voltage, current during electrodeposition) described below (when applicable).

In some examples, precursor liquid solution 310 comprises a supporting salt (e.g., as an additive 340) to enhance the conductivity of precursor liquid solution 310, e.g., when silicon-containing structures 120 are formed by electrodeposition. Some examples of supporting salt include, but are not limited to, tetrabutylammonium chloride ($Bu_4NCl$), tetrapropylammonium chloride ($Py_4NCl$), tetraethylammonium chloride ($Et_4NCl$), lithium chloride (LiCl), 1-Butyl-1-methylpyrrolidinium chloride ($PYR_{14}Cl$), 1-Propyl-1-methylpyrrolidinium chloride ($PYR_{13}Cl$), and other soluble salts. Additional examples of salts include NaCl, KCl, $MgCl_2$, $AlCl_3$, TMACl, TEACl, TPACl, TBACl, TBABr, $NaPF_6$, $NaClO_4$, LiTFSI, LiFSI, NaTFSI, NaFSI, CsCl, $LiPF_6$, $LiBF_4$, $LiClO_4$, $LiAsF_6$, $UN(CF_3SO_2)_2$, $UN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof.

In some examples, precursor liquid solution 310 comprises one or more additives 340. One example of additive 340 includes a surfactant, such as polyvinylpyrrolidone (PVP), ethers (e.g., polyoxyethylene glycol octylphenol and polyoxyethylene glycol alkylphenol), block copolymers of polyethylene glycol (PEG) and polypropylene glycol (PPG), and siloxanes (e.g., hexamethylcyclotrisiloxane [$(CH_3)_2SiO)_3$]). For example, between 0.1% and 10% by weight of a surfactant (e.g., PEG and/or PVP) can be added to precursor liquid solution 310 with stirring. The surfactant reduces the surface tension of precursor liquid solution 310 thereby enabling penetration of precursor liquid solution 310 into pores 130.

Another example of additive 340 is solid particles forming suspension/slurry. Such particles can be used to tune the characteristics of precursor liquid solution 310. Some examples of such particles include, but are not limited to, carbon fillers, metal nanoparticles, and void-forming precursors (e.g., polymers with low char yields which can convert to carbon in the following heat treatment).

If pores are small in carbon materials, molecule sizes could be an important parameter like molecular sieves for selective absorption. Specifically, when the pores are very small (e.g., less than 2 nanometers), the host materials effectively become molecular sieves in which only certain molecules (with the proper/smaller size) can assess the pores. As such, for some operations, precursors with specific molecular weights/sizes can be used. For example, small-sized precursors 320 can be used in precursor liquid solution 310 to ensure the penetration of these precursors 320 into these pores. However, when additional structures 140 are formed to close these pores, the precursors used for these additional structures 140 can have molecular sizes that do not allow them to enter the pores resulting in additional structures 140 forming outside of the pores. Precursors with larger molecular weight or with polymerization reaction after ring-opening, such as cyclopentasilane or cyclohexasilane, can be used for the synthesis of such additional structures. This outside-pore formation of additional structures 140 also ensures that at least a portion of the original pores remains unfilled providing the space for silicon-containing structures 120 to expand into.

In some examples, the surface of carbon-containing structures 110 may be activated in a plasma (e.g., $O_2$/NO) or in a chemical bath (e.g., acid or base treatment). For example, a solution can comprise 1 mol/L phosphoric acid ($H_3PO_4$) or 0.5 mol/L hydrochloride (HCl) aqueous solution (other materials and concentrations are also within the scope) and can be used for a duration of 1-10 hours (e.g., for 4 hours) to treat carbon-containing structures 110. The solution removes the metal and oxide impurities and contaminants and introduces carbonyl-, carboxyl-, or hydroxyl-function groups to the surface of carbon-containing structures 110. These functional groups increase the surface energy and, in turn, facilitate the wetting process with liquids (e.g., precursor liquid solution 310) having low surface tensions.

In some examples, method 200 comprises (block 220) reducing the gas pressure over surface 311 of precursor liquid solution 310 thereby driving precursor liquid solution 310 into pores 130 of carbon-containing structures 110. For example, the pressure can be reduced to below 1 Pa or, more specifically, to below 0.1 Pa. The vapor pressure of precursor liquid solution 310 is an important consideration during this operation as various components of precursor liquid solution 310 can evaporate during this operation. When the vapor pressure is low (e.g., as is the case for ionic liquids), solvents 330 can be difficult to remove by evaporation. In such cases, thermal decomposition at high temperatures can be used for removing solvents and reaction byproducts. In some examples, the pressure is reduced in short pulses to mitigate the evaporation while providing a driving force for precursor liquid solution 310 (to penetrate into pores 130). Overall, various combinations of vacuum levels and durations can be used to minimize processing time. Vacuum levels and duration can be chosen to achieve different levels of pore-filling. A thorough degas, such as at 10 mTorr for 30 min, would remove most of the gas trapped in the structures. In another example, a shorter degas for 10 min, would improve the processing time and leave some unfilled pores, which is beneficial for porosity control and mitigate Si swelling. In some examples, agitation is used when precursor liquid solution 310 has multiple components to reduce concentration gradients while precursor liquid solution 310 enters pores 130.

In some examples, method 200 comprises (block 230) forming silicon-containing structures 120 from precursor 320 within pores 130 and on the exterior surface 112 of carbon-containing structures 110 thereby producing carbon-silicon composite structures 100.

Figure 4A:
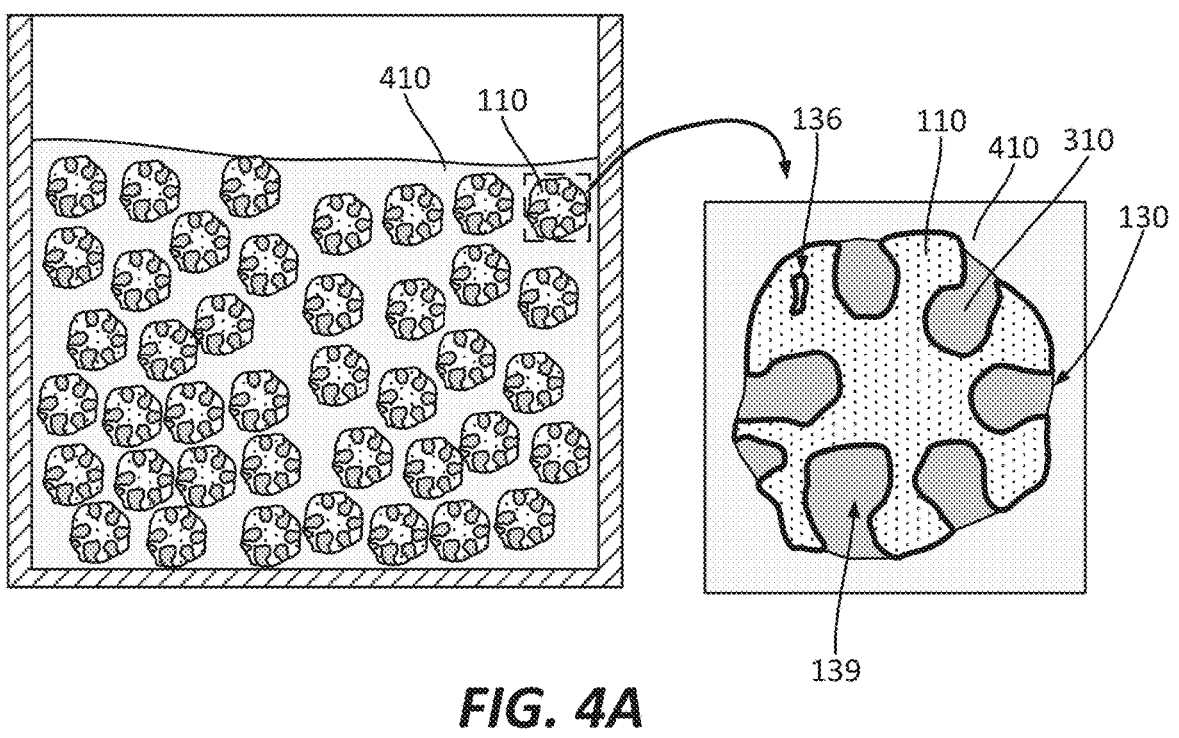
FIG. 4A is a schematic illustration of a reducing liquid solution and carbon-containing structures dispersed within the reducing liquid solution such that the carbon-containing structures contain some residual precursor liquid solution within the pores, in accordance with some examples.
Figure 4B:
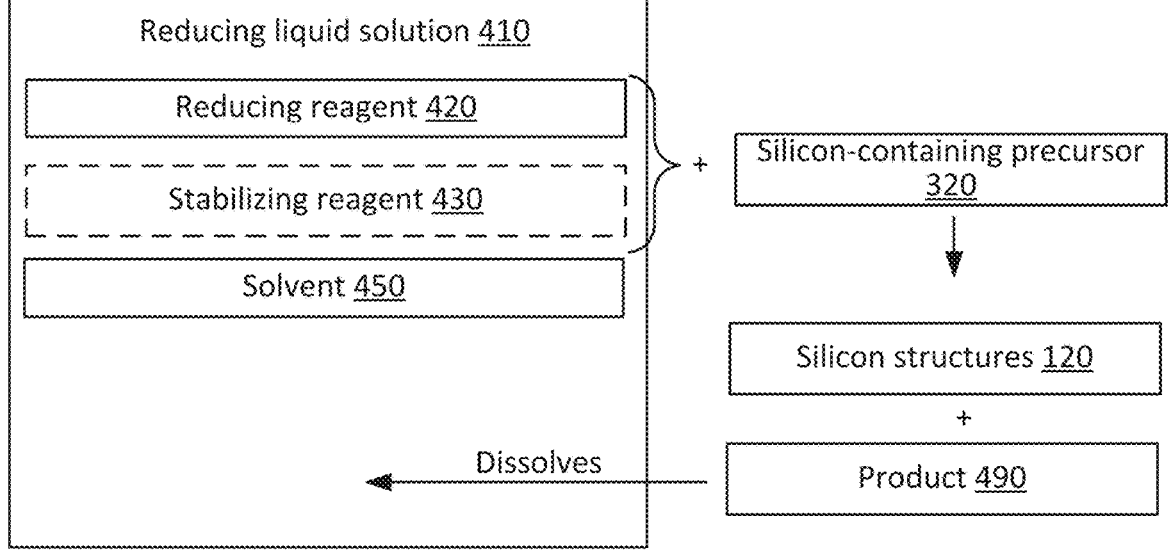
FIG. 4B is a block diagram illustrating various components of the reducing liquid precursor, in accordance with some examples.

In more specific examples, (block 230) forming silicon-containing structures 120 comprises (block 240) removing carbon-containing structures 110 from a bulk of precursor liquid solution 310 and (block 242) submerging carbon-containing structures 110 into reducing liquid solution 410. This type of operation may be referred to as the chemical deposition of silicon-containing structures 120. This operation is schematically shown in FIG. 4A. The composition of reducing liquid solution 410 will now be described with reference to FIG. 4B. When carbon-containing structures 110 are removed from the bulk of precursor liquid solution 310, a portion of precursor liquid solution 310 remains within pores 130 of carbon-containing structures 110 and on exterior surface 112. This portion of precursor liquid solution 310 remains within pores 130 and on the exterior surface 112 of carbon-containing structures 110 when carbon-containing structures 110 are submerged into reducing liquid solution 410. Reducing liquid solution 410 comprises reducing reagent 420 that reacts with precursor 320 in that portion of precursor liquid solution 310 (remaining within pores 130 and on exterior surface 112) forms silicon-containing structures 120 at least within pores 130 and, in some examples, on exterior surface 112. Limiting the silicon deposition only within the pores is desired but can be difficult to achieve. When silicon-containing structures 120 are contained mostly in the pores, cycling stability improves. In this example, the surfaces of carbon-silicon composite structures 100 and/or any secondary structures formed from carbon-silicon composite structures 100 can remain relatively intact for better inter-particle electronic contact and electron transport. Furthermore, this exterior surface (i.e., the surface outside the pores) remains reserved for later coating or SEI formation (to keep it more stable). In some examples, high concentrations of precursor 320 can be used for soaking while low-concentration of reducing reagents 420 can be used to reduce the deposition of the exterior surface. Furthermore, an intermediate washing operation can be used to remove precursor 320 from the exterior surfaces before introducing reducing reagents 420.

In some examples, reducing reagent 420 is one or more sodium borohydride ($NaBH_4$) and lithium aluminum hydride ($LiAlH_4$). Similar to precursor liquid solution 310, reducing liquid solution 410 needs to balance physical properties viscosity, surface tension, and vapor pressure with chemical properties reduction speed, pH, and salt removal. In one example, $NaBH_4$ solution (e.g., 12 wt %) in 14 mol/L NaOH is used. The initial pH can be tuned in the range of 14~10 by diluting with the silicon precursor solution. With higher pH, the reaction is quicker and the deposition of silicon is faster. With a lower pH (of about 10), the silicon deposition is slower and the coating is more conformal due to less concentration gradient. In some examples, agitation is used to uniformly supply reducing reagent 420 and to avoid liquid intermixing as well as avoid deposition in the unwanted site. Furthermore, agitation can help with the removal of the byproducts of salts that need to be removed.

One example of chemical deposition involves a chemical reduction of $SiCl_4$ with different reducing agents such as hydrides including sodium borohydride ($NaBH_4$), lithium aluminum hydride ($LiAlH_4$), sodium hydride (NaH), silicon hydride (SiHx), sodium biphenyl, lithium biphenyl, potassium biphenyl, sodium naphthalene, lithium naphthalene, potassium naphthalene, potassium crown ether, such as:

$$2SiCl_4 + NaBH_4 + 2H_2O \rightarrow 2Si\downarrow + NaBO_2(aq.) + 8HCl\uparrow$$

Specifically, in the presence of OH⁻ groups in a base solution to stabilize $NaBH_4$, the salt byproducts can be soluble in the solutions and washed away during filtration:

$$2SiCl_4 + NaBH_4 + 8NaOH \rightarrow 2Si\downarrow + NaBO_2(aq.) + 8NaCl(aq.) + 6H_2O$$

The synthesis can be fluidized for continuous production if the filtration (filling porous carbon) and reduction processes are arranged in sequence.

In some examples, (block 240) removing carbon-containing structures 110 from the bulk of precursor liquid solution 310 comprises one of centrifuging and filtering. The same techniques can be used for (block 260) removing carbon-containing structures 110 from reducing liquid solution 410. Furthermore, it should be noted that when silicon-containing structures 120 are formed electrochemically (as further described below), reducing liquid solution 410 may not be used, As such, removing carbon-containing structures 110 from the bulk of precursor liquid solution 310 is performed after (block 230) forming silicon-containing structures 120 (as shown with block 260) rather than a part of the forming operation (as shown with block 240).

In some examples, the weight ratio of the portion of precursor liquid solution 310 remaining within pores 130 and on exterior surface 112 of carbon-containing structures 110, after (block 240) removing carbon-containing structures 110 from the bulk of precursor liquid solution 310, is between 0.01 and 1000 based on the total weight of carbon-containing structures 110 and the remaining portion of precursor liquid solution 310.

In some examples, liquid solution 410 further comprises a stabilizing reagent (as additive 430) configured to form a byproduct soluble in reducing liquid solution 410 when a combination of reducing reagent 420 and stabilizing reagent reacts 430 with precursor 320. Some examples of the stabilizing reagent include, but are not limited to, NaOH, LiOH, and KOH. Bases (e.g., LiOH, KOH) and surfactants to improve wetting such as Polyvinylpyrrolidone PVP or PEG, etc. Nano-Si could react with a strong base too so it helps protect deposited Si.

Referring to FIG. 5, in some examples, carbon-containing structures 110 are supported on working electrode 510. The reference electrode 520 is further submerged into precursor liquid solution 310. The forming operation (block 230) comprises (block 250) applying a potential between the working electrode 510 and reference electrode 520 thereby electrochemically forming silicon-containing structures 120.

In some examples, a porous carbon material (used as carbon-containing structures 110) can be pressed into pellets (e.g., with a nominal density of 0.1-10 $g/cm^3$ or, more specifically, between 0.5-2 $g/cm^3$ that may correspond to 10-90% porosity or, more specifically, between 30-70% porosity). These pellets can be attached to a working electrode (WE) in an electrochemical cell. The solution may contain $SiCl_4$ as a precursor 320 and tetrabutylammonium chloride ($Bu_4NCl$) as a conductive agent in a propylene carbonate solvent. The working electrode is then biased in cathodic conditions with potentials of −0.5 to −10 V versus the reference electrode, which causes silicon-containing structures 120 to be reduced from $SiCl_4$ and deposited onto the surfaces and into the pores.

In some examples, the potential applied between the working electrode 510 and reference electrode 520 is between −0.5V to −10V or, more specifically, between −1V and −8V, or even between −5V and −7V. These values are specifically selected to ensure the bonding of silicon-containing structures 120 and carbon-containing structures 110.

In some examples, precursor liquid solution 310 further comprises one or more precursors and one or more solvents. For example, the one or more precursors of the electroplating solution are selected from the group consisting of trichlorosilane ($SiHCl_3$), dichlorosilane ($SiH_2SiCl_2$), silicon tetrachloride ($SiCl_4$), silicon tetrabromide ($SiBr_4$), silicon tetraiodide ($SiI_4$), germanium halides (e.g., $GeCl_4$), tin halides ($SnCl_2$), lithium-containing salts (e.g., $LiPF_6$, $LiClO_4$, LiFSI, LiTFSI, $LiNO_3$, LiCl, LiBr, and LiI), other salts (e.g., $AlCl_3$, $PCl_3$) and graphite powder. It should be noted that some materials of these precursors (e.g., lithium, graphite powder) can be incorporated into carbon-silicon composite structures 100 (in addition to silicon).

Overall, the silicon-containing structures 120 may comprise silicon, silicon-metal alloy, silicon suboxide ($SiO_x$, where 0<x<2), silicon carbide, silicon nitride, doped silicon, silicon-lithium alloy, or silicon oxy-carbide. In other examples, silicon may be substituted (partially or fully) by tin or germanium. The structures in which silicon is fully substituted by tin may be referred to as tin-containing structures. The structures in which silicon is fully substituted by germanium may be referred to as germanium-containing structures.

In some examples, the silicon-containing structures 120 may further compromise (e.g., in addition to silicon) one or more of the elements selected from the group of hydrogen (H), lithium (Li), boron (B), carbon (C), nitrogen (N), oxygen (O), fluorine (F), sodium (Na), magnesium (Mg), aluminum (Al), phosphorous (P), sulfur (S), chlorine (Cl), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), bromine (Br), strontium (Sr), zirconium (Zr), niobium (Nb), molybdenum (Mo), indium (In), lanthanum (La), cerium (Ce), tantalum (Ta), tungsten (W), tin (Sn), germanium (Ge), and bismuth (Bi).

The composition of the silicon-containing structures 120 can be expressed in the form of $SiM_xN_y$ where M is one or more of metal, dopant (e.g., As, B, N, and/or P), or carbon elements and N can be one or more of anions. The range of x can be from 0.01 to 99.99%, 0.1 to 99.9%, 0.1 to 99%, 0.1 to 75%, 0.1 to 50%, 0.1 to 25%, 0.1 to 10%, 0.1 to 5%, 0.1 to 1%, 1 to 50%, 1 to 25%, 1 to 10%, 1 to 5%, 2 to 50%, 2 to 25%, 2 to 10%, 2 to 5%, 5 to 25%, 10 to 25%, 10 to 25%, 15 to 25%, 20 to 25%, 5 to 75%, 5 to 50%, 5 to 25%, 5 to 15%, and 5 to 10%. The range of y can be from 0.01 to 99.99%, 0.1 to 99.9%, 1 to 99%, 1 to 75%, 1 to 50%, 1 to 25%, 5 to 25%, 10 to 25%, 10 to 15%, 1 to 10%, 1 to 5%, 2 to 5%, 5 to 75%, 5 to 50%, 5 to 25%, 5 to 15%, and 5 to 10%.

The precursor for the silicon-containing structures 120 may contain metal salts, silane, chlorosilane, organosilane, silicon halide, polymers, or sugars. In the same or other examples, silicon, germanium or tin containing precursors can be selected from the group consisting of $SiF_4$, $SiCl_4$, $SiBr_4$, $SiI_4$, $HSiF_3$, $H_2SiF_2$, $H_3SiF$, $HSiCl_3$, $H_2SiCl_3$, $H_3SiCl$, $HSiBr_3$, $H_2SiBr_2$, $H_3SiBr$, $HSiI_3$, $H_2SiI_2$, $H_3SiI$, $GeCl_4$, $GeBr_4$, $GeI_4$, $SnCl_4$, $SnBr_4$, $Sn(NO_3)_4$, $SnCl_2$, $AlCl_3$, and $PCl_3$. Specific examples of organosilanes include trichlorosilane, trichloromethylsilane ($SiHCl_3$), trichloroethylsilane, ($SiCH_3Cl_3$), trichlorophenylsilane ($Si(C_2H_5)Cl_3$), and dichlorodimethylsilane ($Si(CH_3)_2Cl_2$), diethyldichlorosilane, diethylsilane, dimethylsilane, trimethylsilane, and chloro(dimethyl)phenylsilane, 1,3,5,7-tetravinyl-1,3,5,7-tetramethylcyclotetrasiloxane.

In some examples, the silicon-containing structures 120 also comprise carbon. Such silicon-containing structures 120 can be formed using one or more carbon-generating precursors selected from the group consisting of cholorobenzene ($C_6H_5Cl$), dichlorbenze ($C_6H_4Cl_2$), trichlorobenze ($C_6H_3Cl_3$), hexacholrbenzene ($C_6Cl_6$), dibromobenzene ($C_6H_4Br_2$), chloromethane ($CH_3Cl$), dicholoromethane ($CH_2Cl_2$), trichloromethane ($CHCl_3$), tetrachloro carbon ($CCl_4$), and tetrabromo carbon ($CBr_4$), pitch, acetylene ($C_2H_2$), methane (CH4), propylene ($C_3H_5$), alcohol (e.g., methanol, ethanol, isopropanol alcohol), acetonitrile, benzene, toluene, propylene carbonate, glucose, dopamine, polyethylene glycol (PEG), melamine, phenol formaldehyde resin, polyimide resin, epoxy resin, and cane sugar.

In some examples, one or more precursors (used to form the silicon-containing structures 120) comprise a halide selected from the group consisting of a metal halide, a non-metal halide, an amine, and an amide. For example, the metal halide is selected from the group consisting of titanium tetrachloride (TiCl$_4$), iron(III) chloride (FeCl$_3$), aluminum chloride (AlCl$_3$), and magnesium chloride (MgCl$_2$). The non-metal halide selected from the group consisting of phosphorus trichloride (PCl$_3$), phosphorus pentachloride (PCls), boron trichloride (BCl$_3$), LiPF$_6$, LiClO$_4$, LiFSI, LiTFSI, LiNO$_3$, LiCl, LiBr, LiOH, Li2CO3, Li2C2O4, Li2O2, Li2O, LiO2, Li3N, Li2S, Li3PO4, Li2SO4, Li3BO3, Li(CH3COO), Lithium citrate, Li-EDTA, LiBOB, and LiI. The amine can be selected from the group consisting of trimethylamine (($CH_3)_3N$) and melamine (C$_3$H$_6$N$_6$). The amide can be dimethylformamide (C$_3$H$_7$NO).

In some examples, one or more precursors (used to form the silicon-containing structures 120) comprise one or more oxygen-generating precursors selected from the group consisting of water (H$_2$O), dissolved oxygen, carbon dioxide (CO$_2$), alcohol (e.g., ethanol (CH$_3$CH$_2$OH)), an oxalate salt (e.g., ammonium oxalate (e.g. (NH$_4$)$_2$C$_2$O$_4$)), a carbonate (e.g. (NH4)2CO3), an oxide (e.g. Li2O, Al2O3), hydroxide (e.g. NaOH), and a nitrate salt (e.g., ammonium nitrate (NH$_4$NO$_3$)).

Figures 6A, 6B:
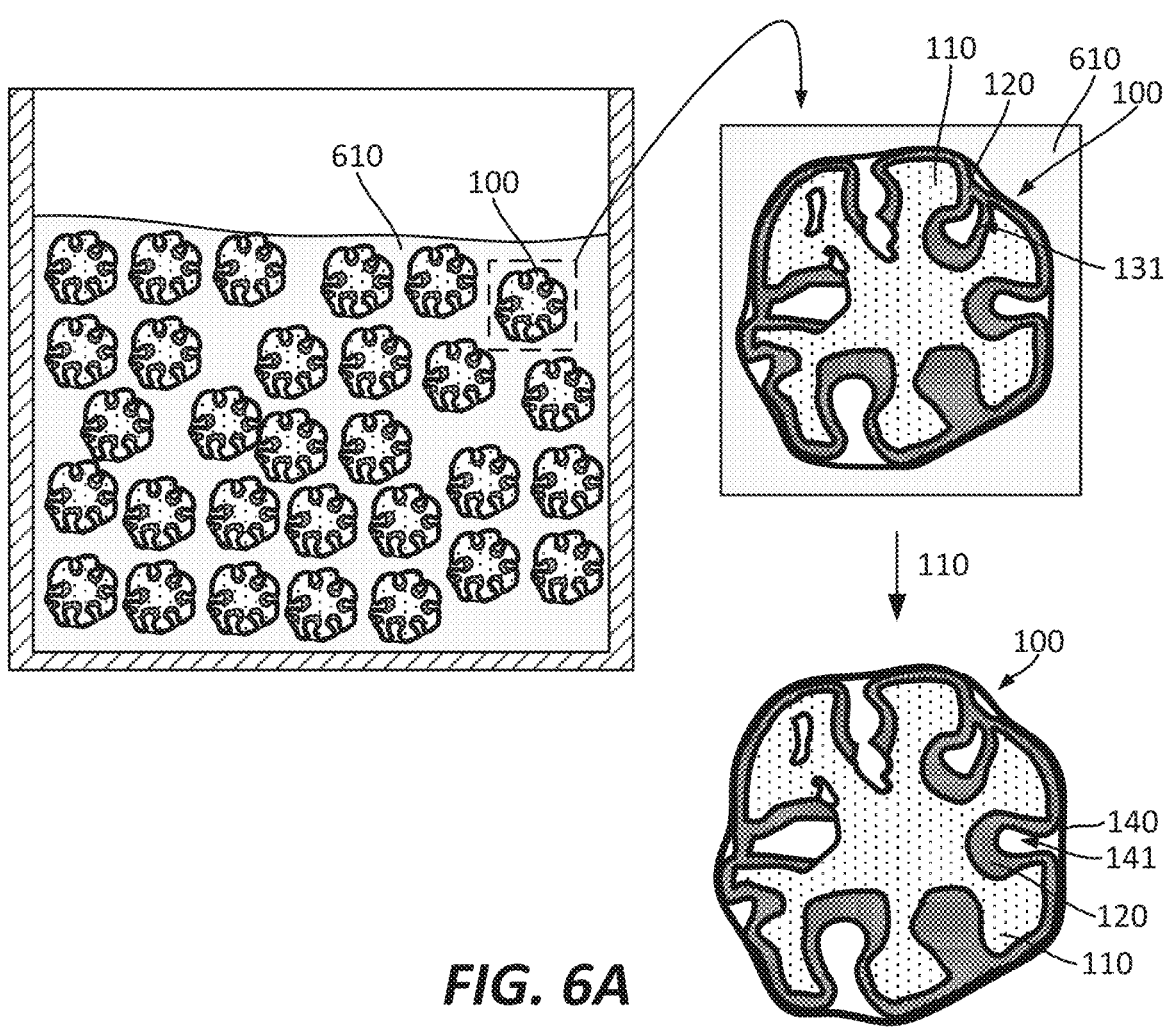
FIG. 6A is a schematic illustration of an additional precursor liquid solution and carbon-silicon composite structures dispersed within this solution, in accordance with some examples.
FIG. 6B is a block diagram illustrating various components of the additional precursor liquid precursor, in accordance with some examples.

In some examples, method 200 further comprises (block 270) submerging carbon-silicon composite structures 100 into additional precursor liquid solution 610, e.g., as schematically shown in FIG. 6A. At this stage, carbon-silicon composite structures 100 comprise silicon-containing structures 120 at least with pores 130 of carbon-containing structures 110. Furthermore, during this operation, pores 130 remain substantially free from additional precursor liquid solution 610. Method 200 proceeds with (block 272) forming additional structures 140 at openings of pores 130 thereby sealing pores 130 from the environment. It should be noted that since additional precursor liquid solution 610 is not introduced into pores 130, additional structures 140 are generally not formed within these pores 130. As such, pores 130 remain available, and silicon-containing structures 120 can expand into these pores during lithiation. For example, additional precursor 620 (used in additional precursor liquid solution 610) may have a molecular size that is larger than the pore opening. As such, these pore openings are operable as molecular sieves as further described above. Additional components of additional precursor liquid solution 610 include but are not limited to additional solvents 630 and/or additional additives 640, e.g., as schematically shown in FIG. 6B.

In some examples, carbon-containing structures 110 are formed by repeating the electrochemical or chemical reduction of silicon-containing structures 120 from a liquid precursor. An example is that the product from the previous examples can be used as a precursor for another soaking-reduction process to produce further functionalized surface coatings. The yield of the second precursor can be chosen to yield voids to allow silicon expansion yet maintain a low surface area of the particle on the microscale. Such a design can reduce the consumption of electrolytes on the active material's surfaces and reduce exposure to newly formed surfaces during cycling.

In some examples, additional precursor liquid solution 610 can be used for other types of structures, e.g., carbon structures over previously-formed silicon-containing structures 120 and pore openings.

It should be noted that additional precursor liquid solution 610 can have specific properties (viscosity, surface tension) that prevent its penetration into pores 130. Furthermore, pores 130 are already partially filled with silicon-containing structures 120.

In some examples, additional precursor liquid solution 610 comprises water-soluble molecules (e.g., glucose dissolved in water) or oil-soluble polymers (e.g., polyamide imides dissolved in NMP). For example, PAI/NMP soaking would only create carbon-containing molecules on surfaces due to viscosity.

In some examples, additional precursor liquid solution 610 and precursor liquid solution 310 differ in one or more of viscosity, surface tension, and temperature.

In some examples, the exposed surface area of carbon-silicon composite structures 110 is reduced by at least two times after depositing additional structures 140 at openings of pores 130. In some examples, the porosity of carbon-silicon composite structures 100, after depositing the additional structures 140 at openings of pores 130, is at least 30%.

In some examples, method 200 further comprises (block 280) annealing carbon-silicon composite structures 100 thereby converting silicon-containing structures 120 from an amorphous state to at least a partially crystalline state or, more specifically, to a substantially crystalline state. For example, the annealing can be performed in an environment comprising at least one of argon, hydrogen, and nitrogen. In some examples, the annealing is performed at a temperature less than 900° C. or even less than 800° C.

Alternatively, silicon-containing structures 120 can remain substantially amorphous (e.g., greater than 50% amorphous by volume, greater than 75%, or even greater than 90%). The annealing operation may not be performed in some examples. It should be noted that silicon-containing structures 120 can be substantially amorphous in a deposited state.

Experimental Results

Figure 7A:
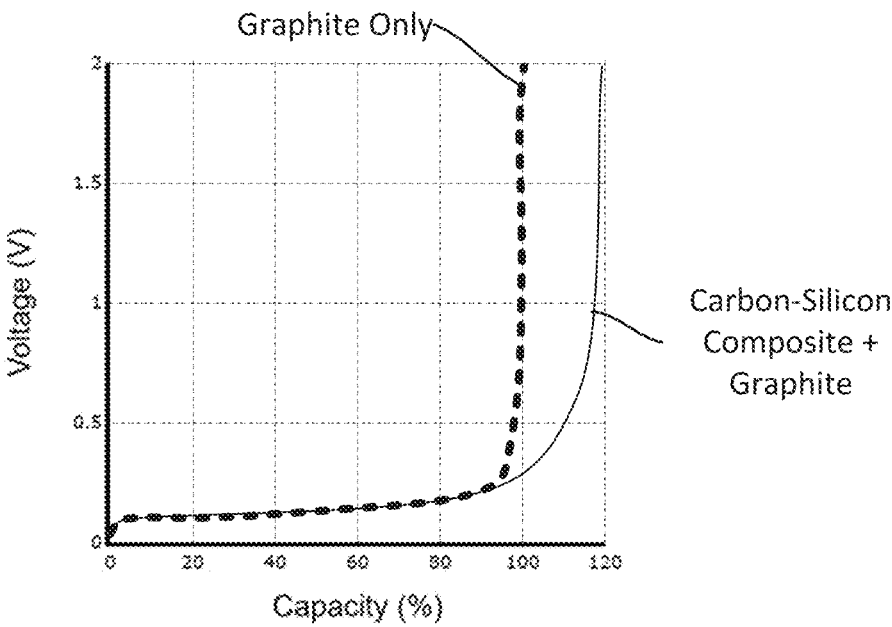
FIGS. 7A and 7B are various experimental results showing the performance of carbon-silicon composite structures in comparison to carbon-containing structures.
Figure 7B:
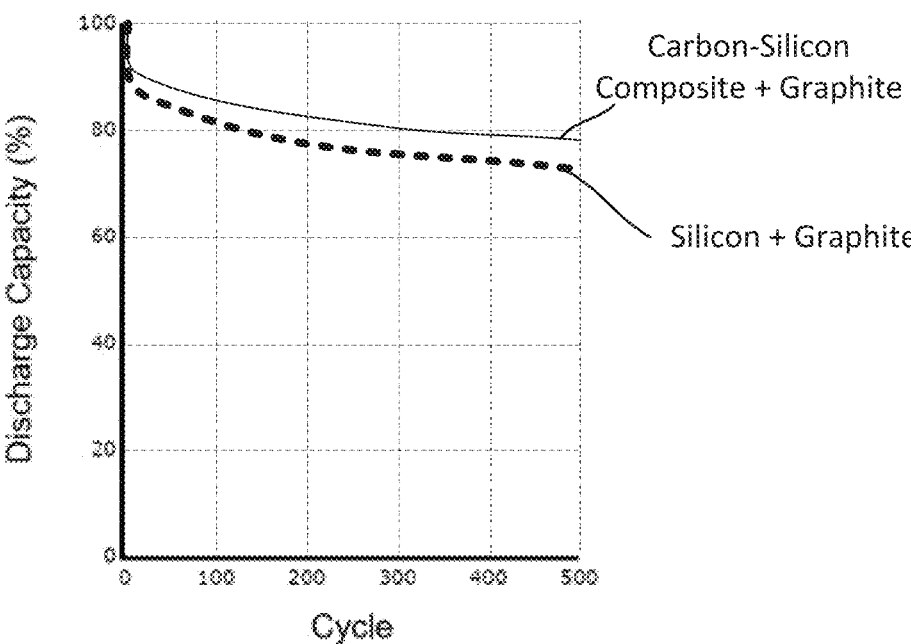

FIGS. 7A and 7B are various experimental results showing the performance of carbon-silicon composite structures in comparison to carbon-containing structures. Specifically, carbon-silicon composite structures were prepared by filtrating porous carbon material with SiCl$_4$ under vacuum (−90 kPa) for 15 min. The powder was centrifuged to remove excess liquid and subsequently added to sodium borohydride (NaBH$_4$) and sodium hydroxide (NaOH) aqueous solution and stirred for 30 min. The resultant powder was rinsed and filtered with de-ionized water 3 times to remove the salt byproducts (NaBO$_2$ and NaCl) thereby forming carbon-silicon composite structures. Porous carbon was used as a reference material (carbon-containing structures) and did not contain any silicon.

Both carbon-silicon composite structures and carbon-containing structures were used to prepare test cells. Specifically, these structures (in a powder form) were mixed into a slurry containing 80% of these structures, 10% carbon black, and 10% PAA. This slurry was coated and tested in a half-cell configuration with a voltage range of 10 mV-2 V at a 0.1 C rate. FIG. 7A shows that the cells with carbon-silicon composite structures had a higher specific capacity (about 20% improvement) than the cells with carbon-containing structures ("carbon only"). The slanted voltage in the range of 0.25~1 V of the Si/carbon composite indicates the Si exhibits the amorphous Li$_x$Si→Si conversion because there is no clear plateau at ~0.45 V for the crystalline Li$_{3.75}$Si→Si conversion. This can be attributed to the very small Si domains formed in the wet chemical process and is beneficial for stable cycling.

In another test, carbon-silicon composite structures and, separately, carbon-containing structures were formed into negative electrodes that were combined with NCM622-based positive electrodes to form full cells. The amounts of the carbon-silicon composite structures and carbon-containing structures in these cells were specifically selected to achieve the same capacity. The electrolyte is 1M LiPF$_6$ dissolved in EMC/EC (3:7 by weight) solvents with a 5% FEC additive. The full cells were cycling in the voltage range of 2.8-4.2 V at a 1 C rate. The control sample is a Si/graphite reference anode by blending nano-Si (200~500 nm in size) and graphite powder. FIG. 7B shows that with the same design of cell balance, the C-coated Si-loaded porous carbon shows better retention (~5% better at the end of the 500$^{th}$ cycle) than the conventional Si/graphite mixed composite.

Examples of Electrochemical Cells

Figure 8:
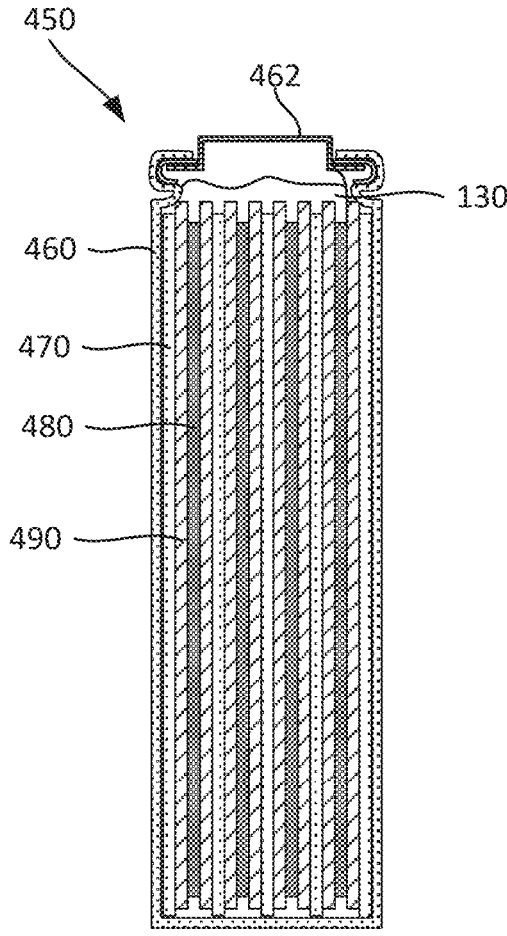
FIG. 8 is a schematic illustration of an electrochemical cell, fabricated with carbon-silicon composite structures on the negative electrode, in accordance with some examples.

FIG. 8 is a schematic illustration of electrochemical cell 450, comprising first electrode 470, second electrode 480, and separator 490 arranged in a stack, wound jelly-roll, or any form. One of these electrodes can be a negative battery electrode fabricated with carbon-silicon composite structures, described above. Separator 490 is disposed between first electrode 470 and second electrode 480 to prevent direct contact between first electrode 470 and second electrode 480 yet allows ionic communication (by being soaked with electrolyte) between these electrodes. Specifically, separator 490 may include pores allowing ions to pass.

Electrochemical cell 450 also includes electrolyte, which operates as a carrier of ions during the cycling of electrochemical cell 450. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of such electrochemical cells include, but are not limited to, lithium-ion batteries, lithium polymer batteries, lithium-air batteries, lithium sulfite batteries, lithium metal batteries, solid-state batteries, supercapacitors, and the like.

In some examples, case 460 is rigid (e.g., the case is a steel can). Other types of cells may be packed into a flexible, foil-type (e.g., polymer laminate) case. The case material selection depends on the polarity of case 460 (e.g., neutral, connected to positive electrodes, connected to negative electrodes) as well as the composition of the electrolyte, operating potentials of electrochemical cell 450, and other factors. For example, when case 460 is connected to a positive electrode, case 460 may be formed from titanium, titanium alloys, aluminum, aluminum alloys, and/or stainless steel. On the other hand, if case 460 is connected to a negative electrode, then case 460 may be made from titanium, titanium alloys, copper, nickel, lead, and stainless steel. The electrical connection between case 460 and an electrode may be established by direct contact between case 460 and this electrode (e.g., an outer wound of the jelly roll), by a tab connected to the electrode and case 460, and other techniques.

The top of case 460 may be open and used for insertion of the electrode assembly (e.g., a jelly roll) and then capped with a header assembly, which may include a weld plate, a rupture membrane, a PTC-based resettable fuse, and an insulating gasket. The insulating gasket is used to support the conductive components of the header assembly and to insulate these components from case 460. In some examples, a PTC-based resettable fuse is disposed between the edges of the rupture membrane and the edges of the header cup, effectively interconnecting these two components. At normal operating temperatures, the resistance of PTC-based resettable fuse is low. However, its resistance increases substantially when heated. For example, the PTC-based resettable fuse may be a thermally activated circuit breaker that can electrically disconnect the rupture membrane from the header cup.

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A method of producing carbon-silicon composite structures, the method comprising:

submerging carbon-containing structures into a liquid-phase precursor liquid solution comprising a liquid solvent and a molecular precursor dissolved in the liquid solvent, wherein the carbon-containing structures comprise pores defined by pore walls and an exterior surface extending among the pores;

reducing a gas pressure over a surface of the liquid-phase precursor liquid solution driving the liquid-phase precursor liquid solution into the pores of the carbon-containing structures; and forming silicon-containing structures from the molecular precursor of the liquid-phase precursor liquid solution within the pores and on the exterior surface of the carbon-containing structures, thereby producing the carbon-silicon composite structures with the pores at least partially filled with the silicon-containing structures and with the silicon-containing structures attached to the pore walls, wherein forming the silicon-containing structures comprises:

(a) removing the carbon-containing structures from a bulk of the liquid-phase precursor liquid solution such that a portion of the liquid-phase precursor liquid solution remains within the pores of the carbon-containing structures and on the exterior surface, and (b) submerging the carbon-containing structures, with the portion of the liquid-phase precursor liquid solution remaining within the pores and on the exterior surface of the carbon-containing structures, into a reducing liquid solution comprising a reducing reagent that chemically reacts with the molecular precursor in the portion of the liquid-phase precursor liquid solution remaining within the pores and on the exterior surface forms the silicon-containing structures at least within the pores, and wherein the reducing reagent is one or more of sodium borohydride (NaBH4), lithium aluminum hydride (Li-AlH4), sodium hydride (NaH), silicon hydride (SiHx), sodium biphenyl, lithium biphenyl, potassium biphenyl, sodium naphthalene, lithium naphthalene, potassium naphthalene, and potassium crown ether.

2. The method of claim 1, wherein, prior to forming the silicon-containing structures, the carbon-containing structures have a porosity of at least 1 m2/g.

3. The method of claim 1, wherein the carbon-containing structures comprise at least one of graphite, hard carbon, glassy carbon, carbon foam, carbon paper, carbon molecular sieve, carbon black, activated carbon, carbon fibers, carbon nanotubes, graphene and graphene derivatives, and zero-dimensional fullerene and fullerene derivatives.

4. The method of claim 1, wherein the silicon-containing structures comprise a layer coating interior surfaces of the pores, coating the exterior surface of the carbon-containing structures, or coating both the interior surfaces of the pores and the exterior surface of the carbon-containing structures.

5. The method of claim 4, wherein an average thickness (T) of the layer formed by the silicon-containing structures is between 1 nanometer and 50 micrometers.

6. The method of claim 1, wherein the molecular precursor is one or more of silicon tetrafluoride (SiF4), silicon tetrachloride (SiCl4), silicon tetrabromide (SiBr4), silicon tetraiodide (SiI4), HSiF3, H2SiF2, H3SiF, HSiCl3, H2SiCl3, H3SiCl, HSiBr3, H2SiBr2, H3SiBr, HSiI3, H2SiI2, H3SiI, germanium tetrachloride (GeCl4), germanium tetrabromide (GeBr4), germanium tetraiodide (GeI4), tin tetrachloride (SnCl4), tin tetrabromide (SnBr4) tin tetra nitrate (Sn(NO3)4), tin (II) chloride (SnCl2), aluminum chloride (AlCl3), phosphorous chloride (PCl3), lithium hexafluorophosphate (LiPF6), lithium perchlorate (LiClO4), lithium Bis(fluorosulfonyl)imide (LiFSI), lithium bis(trifluoromethanesulfonyl)imide (LiTFSI), lithium nitrate (LiNO3), lithium chloride (LiCl), lithium bromide (LiBr), lithium iodode (LiI), cholorobenzene (C6H5Cl), dicholorbenze (C6H4Cl2), trichlorobenze (C6H3Cl3), hexacholorbenzene (C6Cl6), dibromobenzene (C6H4Br2), chloromethane (CH3Cl), dicholoromethane (CH2Cl2), trichloromethane (CHCl3), tetrachloro carbon (CCl4), and tetrabromo carbon (CBr4), pitch, acetylene (C2H2), methane (CH4), propylene (C3H6), methanol (CH3OH), ethanol (C2H5OH), isopropanol (C3H8O), acetonitrile (CH3CN), benzene (C6H6), toluene (C6H5CH3), propylene carbonate, glucose, dopamine, polyethylene glycol (PEG), melamine, phenol formaldehyde resin, polyimide resin, epoxy resin, cane sugar, and graphite powder.

7. The method of claim 1, wherein:
the carbon-containing structures are supported on a working electrode;
a reference electrode is further submerged into the liquid-phase precursor liquid solution; and
forming the silicon-containing structures comprises applying a potential between the working electrode and the reference electrode, thereby electrochemically forming the silicon-containing structures.

8. The method of claim 1, further comprising:
submerging the carbon-silicon composite structures, comprising the silicon-containing structures at least with the pores of the carbon-containing structures, into an additional precursor liquid solution such that the pores remain substantially free from the additional precursor liquid solution; and
forming additional structures at openings of the pores thereby sealing the pores from environment.

9. The method of claim 8, wherein a porosity of the carbon-silicon composite structures, after forming the additional structures at the openings of the pores, is at least 30%.

10. The method of claim 1, wherein the liquid-phase precursor liquid solution further comprises a supporting salt selected from the group consisting of tetrabutylammonium chloride (Bu4NCl), tetrapropylammonium chloride (Py4NCl), tetraethylammonium chloride (Et4NCl), lithium chloride (LiCl), 1-butyl-1-methylpyrrolidinium chloride (PYR14Cl), and 1-propyl-1-methylpyrrolidinium chloride (PYR13Cl).

11. The method of claim 1, wherein the liquid-phase precursor liquid solution further comprises one or more surfactant additives selected from the group consisting of polyvinylpyrrolidone (PVP), a polyoxyethylene glycol octylphenol, polyoxyethylene glycol alkylphenol, a block copolymer of polyethylene glycol (PEG), polypropylene glycol (PPG), and a siloxane.

12. The method of claim 11, wherein the one or more surfactant additives have a concentration of between 0.1% and 10% by weight in the liquid-phase precursor liquid solution.

13. The method of claim 1, wherein:
the liquid-phase precursor liquid solution further comprises solid particles forming a suspension, and
the solid particles are selected from the group consisting of carbon fillers, metal nanoparticles, and void-forming precursors.

14. The method of claim 1, further comprising, prior to submerging the carbon-containing structures into the liquid-phase precursor liquid solution, activating the carbon-containing structures using plasma.

15. The method of claim 1, wherein the gas pressure is reduced over the surface of the liquid-phase precursor liquid solution to below 0.1 Pa.

16. The method of claim 1, further comprising, after submerging the carbon-containing structures into the liquid-phase precursor liquid solution, agitating the liquid-phase precursor liquid solution while the liquid-phase precursor liquid solution enters the pores of the carbon-containing structures.

17. The method of claim 1, wherein:
the molecular precursor is silicon tetrachloride (SiCl4),
the reducing reagent is sodium borohydride (NaBH4), and
the reducing liquid solution further comprises sodium hydroxide (NaOH).

18. The method of claim 1, wherein the silicon-containing structures comprise one or more non-silicon materials selected from the group consisting of carbon, lithium, oxygen, titanium, nitrogen, magnesium, calcium, boron, phosphorous, fluorine, chlorine, bromine, iodine, hydrogen, iron, aluminum, copper, nickel, tin, and germanium.

* * * * *